United States Patent [19]
Strandberg et al.

[11] 3,709,394
[45] Jan. 9, 1973

[54] LOADING TOOL HAVING A LOADING FORK

[75] Inventors: Bengt Sigurd Lennart Strandberg; Maj Strandberg, both of Hudiksvall, Sweden

[73] Assignee: Hiab-Foco Aktiebolag, Hudiksvall, Sweden

[22] Filed: Oct. 28, 1970

[21] Appl. No.: 84,558

[30] Foreign Application Priority Data

Oct. 29, 1969    Sweden ............................... 14772/69

[52] U.S. Cl. ................................................. 214/750
[51] Int. Cl. ................................................. B65g 67/00
[58] Field of Search ....................... 214/731, 750, 34

[56] References Cited

UNITED STATES PATENTS

| | | | |
|---|---|---|---|
| 2,574,045 | 11/1951 | Lapham | 214/750 |
| 3,082,893 | 3/1963 | Hollings et al. | 214/34 |
| 889,321 | 6/1908 | Meigs et al. | 89/47 |

*Primary Examiner*—Gerald M. Forlenza
*Assistant Examiner*—Lawrence J. Oresky
*Attorney*—Newton, Hopkins & Ormsby

[57] ABSTRACT

A device, particularly for use in loading forks having two fork legs which are adapted for movement into and out of a stand frame and which consist of hingedly interconnected chain links with the pivot shafts thereof situated at a level above the abutting sides of the links such that from a horizontal position the links are foldable only upwards. The characteristic features of the device are that each chain link comprises two side pieces between which extend the link pivot shafts and between which each pivot shaft supports a roller, and that one arcuate guide is provided in the stand frame for each link chain for supporting the rollers of the chain links positioned closest to the stand frame and for guiding the link chain in lateral direction, when the link chain is being retracted into the stand frame.

3 Claims, 10 Drawing Figures

PATENTED JAN 9 1973

INVENTORS
BENGT SIGURD LENNART STRANDBERG
MAJ STRANDBERG
BY: Newton, Hopkins, & Ormsby
ATTORNEYS

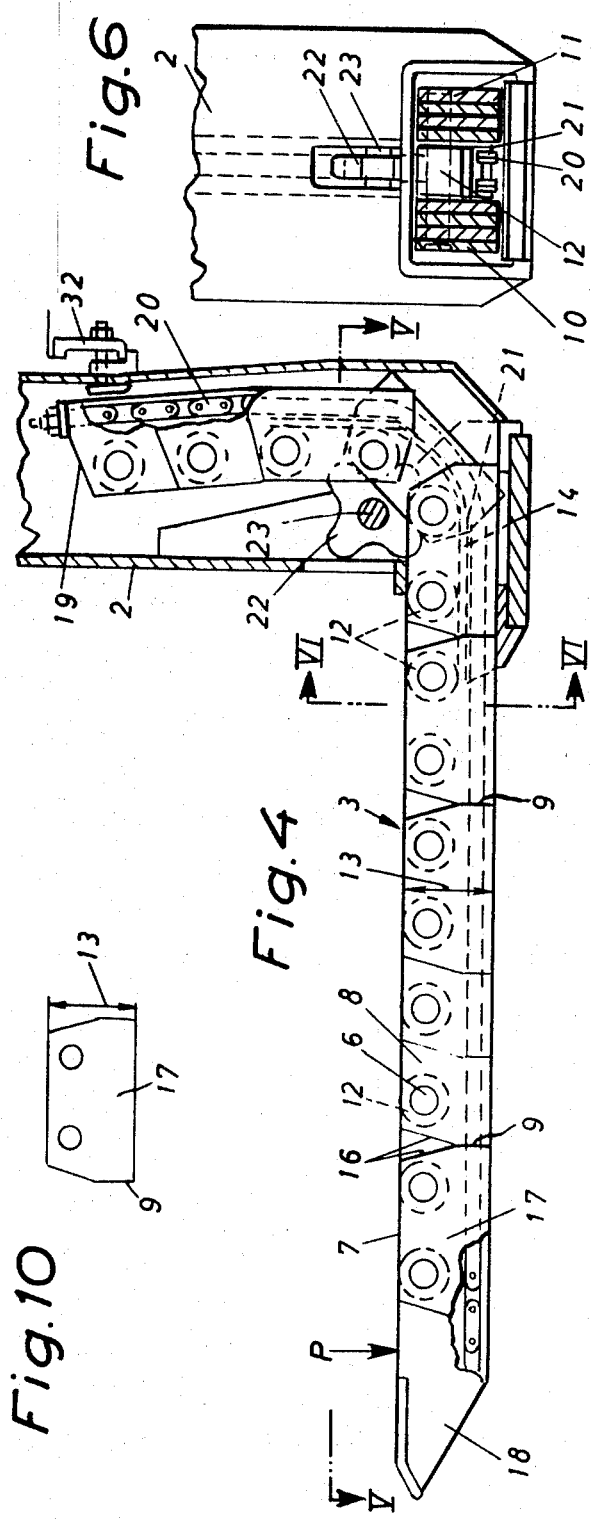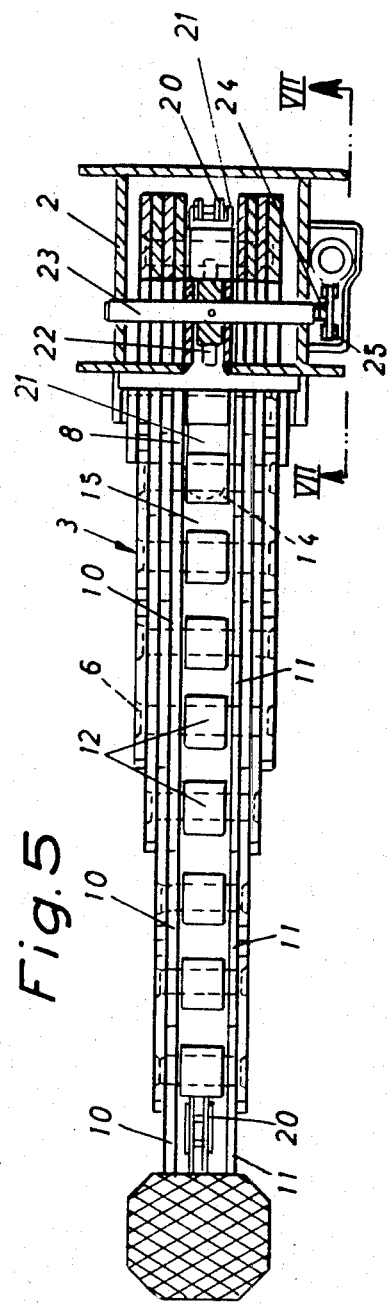

LOADING TOOL HAVING A LOADING FORK

SUMMARY OF THE INVENTION

The present invention relates to loading tools of the kind having a loading fork comprising two fork legs which are adapted for movement into and out of a stand frame, each leg consisting of a link chain with the links thereof abutting against each other below the link pivot shafts such that from a horizontal position, the links become foldable only upwards and back to the original position. The invention is characterized in that each chain link is composed of two side pieces between which extend the link pivot shafts and between which each pivot shaft supports a roller means the diameter of which is less than the width of the side pieces, and in that for each link chain the stand frame is provided with an arcuate guide adapted to support the roller means of the chain links positioned closest to the stand frame and to guide, during retraction, the respective link chain in lateral direction while said link chain is being bent upwards approximately normally when entering into the stand frame.

The invention thus relates to a combination of a particularly constructed roller chain and a guide supporting its respective link chain in such a way that said chain slides on and is supported by the guide by means of its rollers while at the same time the guide controls the link chain in the lateral direction. Owing to the simplicity of the inventive object, the manufacturing costs of the loading tool are small, the added advantage being provided that displacement of the link chains into and out of the frame is easy as the links with their rollers are supported by and roll on their respective guide.

According to a further development of the invention it also becomes possible to make the link chains stepped such that the chain links become increasingly bigger the closer they are positioned to the stand frame, i.e. such that the side pieces of the links positioned at the outer free ends of the chains are for instance single pieces whereas the side pieces of the links closest to the frame are multiple pieces. Consequently, the links become thicker the closer they are situated to the frame, but this fact does not impair control of the link chains in the lateral direction as the guide only abuts against the inside of the link side pieces which are spaced an equal distance apart.

In accordance with a further development of the invention the loading tool comprises a device by means of which it is possible to operate each fork leg separately for movement into and out of the frame. This device makes possible, without displacing the loading vehicle, such as for instance a truck on which the loading tool is mounted, to turn the goods to be loaded by means of the tool about a vertical axis, thus facilitating directing and positioning the goods to the correct place, for instance in a storage room, or the like.

BRIEF DESCRIPTION OF THE DRAWINGS

FIG. 4 shows on an enlarged scale a vertical section through the frame with the fork leg in extended position.

FIG. 5 is a horizontal section along line V—V of FIG. 4.

FIG. 6 is a vertical section along line VI—VI of FIG. 4.

FIG. 10 is a side view of a chain link.

DETAILED DESCRIPTION OF A PREFERRED EMBODIMENT

Figure 1:
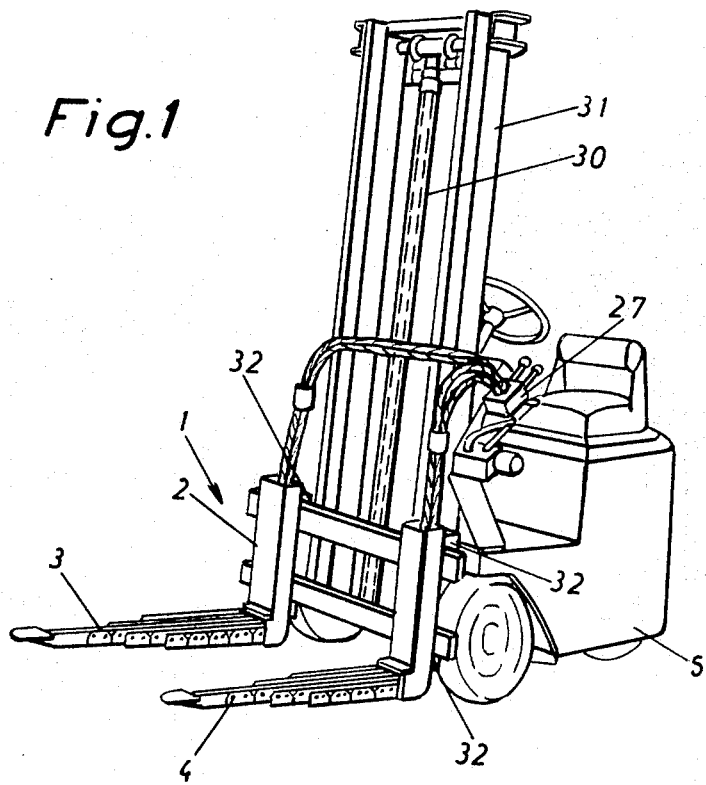
FIG. 1 is a perspective view of a loading tool in accordance with the invention and mounted on a truck.
Figure 2:
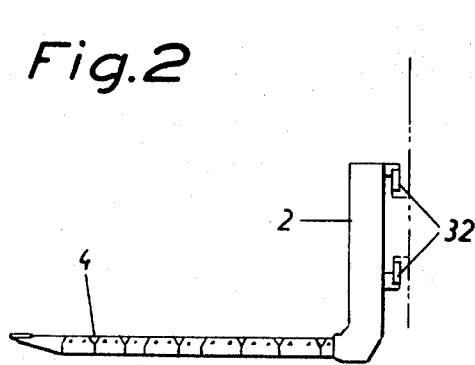
FIG. 2 is a lateral view of one fork leg in its extended position (operative position).
Figure 3:
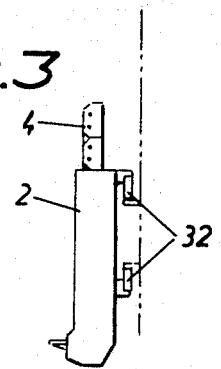
FIG. 3 is a side view of the fork leg in inoperative position (parking or unloaded position).
Figure 7:
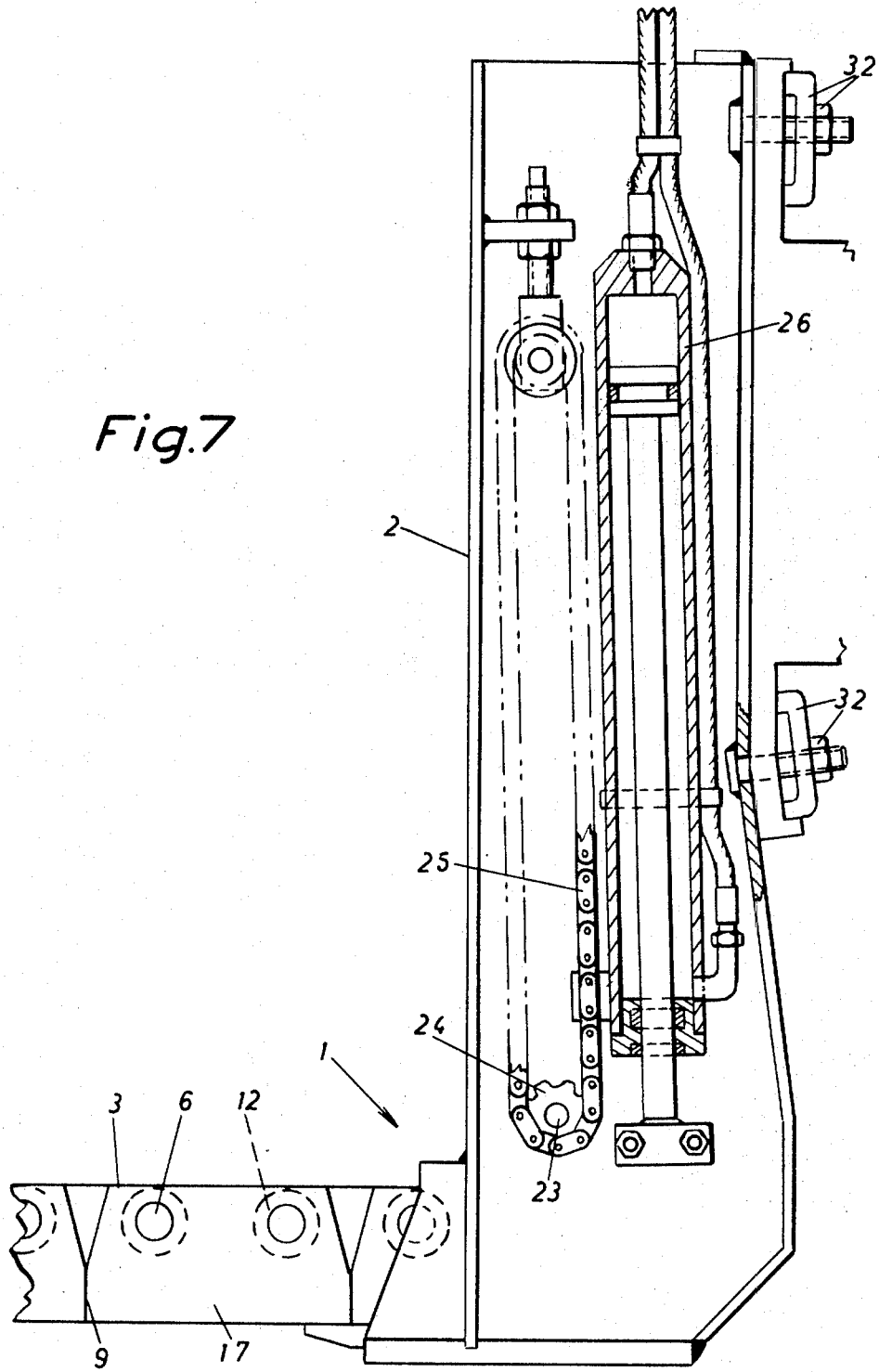
FIG. 7 illustrates on a somewhat larger scale and partly in longitudinal section a side view along line VII—VII of FIG. 5, the protective cap having been removed.

The loading tool 1 shown in FIG. 1 comprises a stand frame 2 and two fork legs 3, 4. The loading tool 1 is removably attached to the front of a truck 5.

Each fork leg 3, 4 is a link chain consisting of several links 7, 8 which are hingedly interconnected by means of shafts 6. Adjacent links rest, when the fork is extended, against each other such that the vertical end surfaces 9 of the links are positioned at a lower level than the shafts 6. Through this arrangement it is possible to swing the links 7, 8 only upwards from the horizontal position. In their horizontally extended position (operative position) the links can support a load P (FIG. 4). Each link comprises two side pieces 10, 11 between which extends the pivot shaft 6 of the link, each such shaft supporting thereon a roller 12. All rollers 12 in the link chain are of equal length which means that the side pieces 10, 11 of all links have their internal faces spaced apart exactly the same distance in the vertical direction. The diameter of the rollers 12 is less than the width 13 of the links 7, 8.

The frame 2 is provided with an arcuate guide 14 extending into the gap 15 between the link side pieces 10, 11 the abutting ends of which above the end surfaces 9 are formed with upwardly diverging edge faces 16. The guide 14 supports the links 8 closest to the frame 2 in that the rollers 12 thereof run on the upper edge of the guide. The guide 14 thus serves both as a supporting means for the load P resting on the fork 3 in question and as a guide in lateral direction for the links 7, 8 when the fork moves into or out of the frame 2. Owing to the fact that the guide 14 is arranged in the vertical longitudinal medium plane of the fork guidance is not dependent on the thickness of the links 7, 8. It thus becomes possible, as is shown in FIG. 4, to step the fork legs 3, 4 in such a way that the side pieces 10, 11 are formed with double or multiple flat steel plates 17 and thus increase in thickness the closer they are situated to the frame 2.

To prevent the fork legs 3, 4 from bending upwards when in extended position (FIGS. 4 and 5) an extensible chain 20 is provided between the outer end link 18 of each fork leg and the inner end link 19. The chain 20 runs in a channel 21 in the guide (FIG. 6).

When the link chains move inwards and outwards, each link 7, 8 cooperates with a chain wheel 22 in the frame 2. The chain wheel is mounted on a shaft 23 which is driven in either direction upon activation from a driving chain 25 via a chain wheel 24, mounted on the same shaft as wheel 22. The driving chain 25 is in turn driven by an hydraulically operated piston-and-cylinder unit 26. Each piston-and-cylinder unit 26 operates its shaft 23. This renders possible to use the piston-and-cylinder units to drive the two shafts 23 in common such that the fork legs 3, 4 are displaced together into or out of the frame 2. By means of an operating mechanism 27 on the truck 5 it is, however, also possible to make the piston-and-cylinder units 26 operate separately and independently of each other, for instance such that one fork leg 3 retracts into the frame 2 while the other fork leg 4 projects out of the same. Through this arrangement it becomes possible to easily and exactly fit a package or the like (not shown) supported on the loading tool into an appropriate place in a stack of goods without moving the truck 5.

Figure 8:
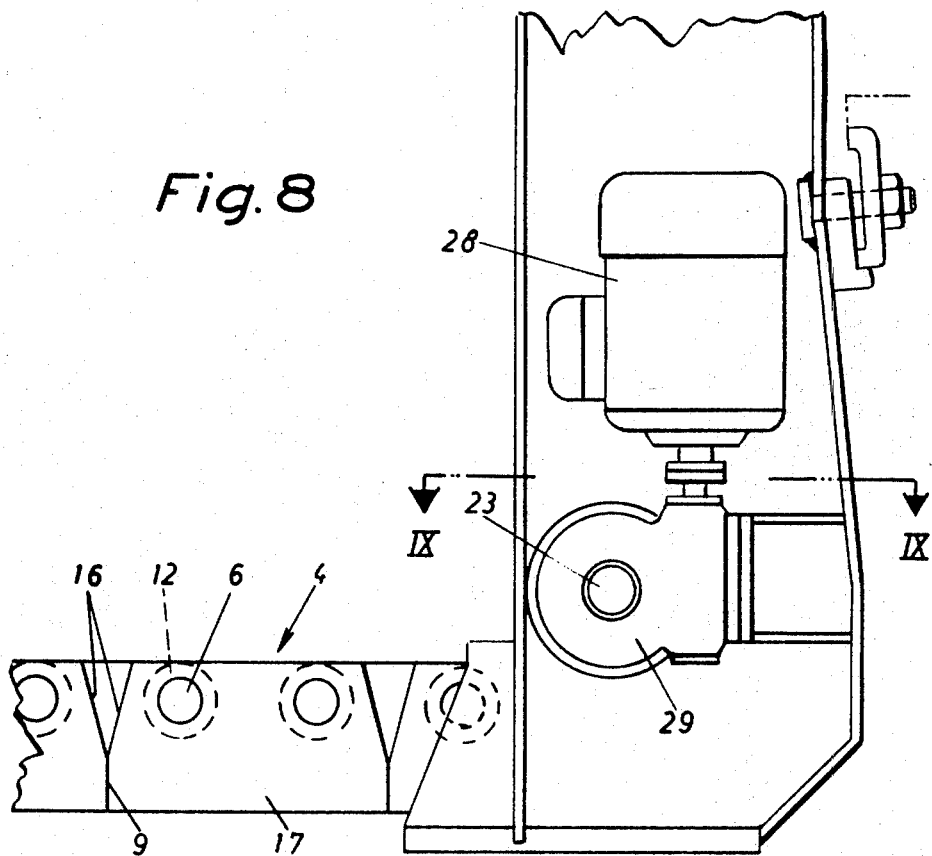
FIG. 8 is a similar view to that of FIG. 7 but shows an alternative embodiment being provided with gear box and electric engine mounted in the frame to replace the chain gear and cylinder shown in FIG. 7.
Figure 9:
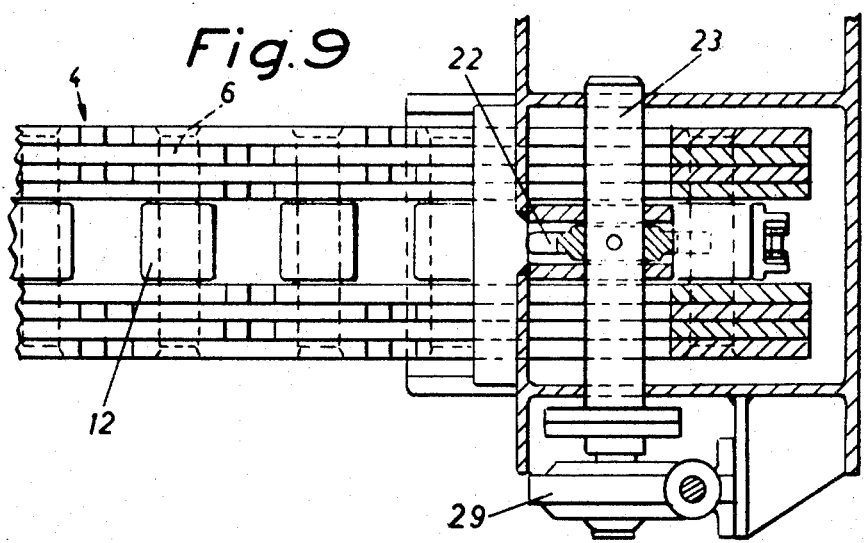
FIG. 9 is a horizontal section along line IX—IX of FIG. 8.

In the embodiment illustrated in FIG. 8 shaft 23 is driven by a motor, such as an hydraulically operated motor or electric motor 28 via a worm gear 29. It is preferable that one driving mechanism of this kind is arranged for each fork leg shaft 23 such that it becomes possible to operate in the manner described above the two fork legs 3, 4 separately and independently of each other.

The entire loading tool, including frame 2 and fork legs 3, 4, is arranged in the usual manner for lifting and lowering along a supporting frame 31 on the truck 5 by means of a rotatably driven screw 30.

The entire loading tool 1 is removably attached to the front of the truck 5 by means of clamping means 32.

The embodiments as shown and described are to be regarded as examples only and the various details of the loading tool may be constructively altered in several ways within the scope of the appended claims. The loading fork may be used with other vehicles than trucks. As examples may be mentioned tractors and loading machines. The extensible chain 20 may be replaced by some other flexible extension means.

In principle it is of course possible to replace rollers 12 by a fixed center piece mounted on each pin or shaft 6, said center piece serving as a distance means between side pieces 10, 11. The frictional forces then increase somewhat when the fork legs are retracted or extended, However, the appended claims, by using the expression roller means, are to be regarded as embracing also this construction of the lifting fork.

What we claim is:

1. Improvement in loading tools of a kind having a loading fork comprising two fork legs which are displaceable into and out of a stand frame, each leg comprising a link chain, the links of said chain being hingedly interconnected by means of pivot shafts, with the links of said chain abutting against each other below their pivot shafts in such a way that they can be folded from a horizontal position only upwards and back to the original position, characterized by the fact that each link chain includes two laterally spaced side pieces, the pivot shafts extending between these side pieces and each pivot shaft carrying a roller between said side pieces, said rollers having a diameter smaller than the width of said side pieces, said stand frame including an arcuate guide for each leg, said arcuate guide being located between said link side pieces and adapted to guide said rollers of said chain links situated closest to said stand frame and operable to guide said chain in a lateral direction during extension and retraction.

2. The improvement defined in claim 1 further characterized in that said links are stepped in such a way that the side pieces of the links situated at the outer free ends of said chains are single pieces while the side pieces of the links situated closest to said stand frame are multiple pieces.

3. The improvement defined in claim 1 further characterized in that each leg includes a flexible extension means having a fixed length and having its opposite ends attached to opposite ends of said link chain at a point situated at a lower level than said link pivot shafts to prevent the fork legs from bending upwards when in an extended position.

* * * * *